US012561223B2

(12) United States Patent
Mutch

(10) Patent No.: US 12,561,223 B2
(45) Date of Patent: Feb. 24, 2026

(54) METHOD FOR DECENTRALIZED ACCESSIONING FOR DISTRIBUTED MACHINE LEARNING AND OTHER APPLICATIONS

(71) Applicant: Cognizant Technology Solutions U.S. Corporation, College Station, TX (US)

(72) Inventor: Karl Mutch, Kenwood, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 1567 days.

(21) Appl. No.: 17/002,444

(22) Filed: Aug. 25, 2020

(65) Prior Publication Data

US 2023/0041582 A1 Feb. 9, 2023

(51) Int. Cl.
*G06F 11/34* (2006.01)
*G06N 20/00* (2019.01)

(52) U.S. Cl.
CPC .......... *G06F 11/3466* (2013.01); *G06N 20/00* (2019.01)

(58) Field of Classification Search
CPC ........................... G06F 11/3466; G06N 20/00
See application file for complete search history.

(56) References Cited

U.S. PATENT DOCUMENTS

| | | | |
|---|---|---|---|
| 9,176,961 B2 | 11/2015 | Klein, Jr. | |
| 9,396,037 B2 | 7/2016 | Morsi et al. | |
| 10,324,923 B1 * | 6/2019 | Chinthagunti | ......... G06Q 30/00 |

| | | | |
|---|---|---|---|
| 10,459,881 B2 | 10/2019 | Barth et al. | |
| 10,528,332 B2 | 1/2020 | Atkinson et al. | |
| 11,036,492 B2 | 6/2021 | Lakshminarayanan | |
| 2007/0203874 A1 * | 8/2007 | Cave | ........................ G06F 16/10 |
| 2013/0282952 A1 * | 10/2013 | Miyamae | ............ G06F 12/0884 |
| | | | 711/120 |
| 2014/0304215 A1 * | 10/2014 | Masinter | ............. G06F 16/1873 |
| | | | 707/602 |
| 2016/0364146 A1 * | 12/2016 | Kuttner | ................. G06F 3/0644 |
| 2018/0032423 A1 * | 2/2018 | Bull | .................... G06F 11/3664 |
| 2018/0341631 A1 * | 11/2018 | Verma | ..................... G06F 40/30 |
| 2019/0286613 A1 * | 9/2019 | Bramante | ................. G06F 7/00 |

(Continued)

OTHER PUBLICATIONS

Riley, Jenn. "Understanding metadata." Washington DC, United States: National Information Standards Organization (http://www. niso. org/publications/press/UnderstandingMetadata. pdf) 23 (2017): 7-10. (Year: 2017).*

(Continued)

*Primary Examiner* — Bradley A Teets
*Assistant Examiner* — Joanne G Macasiano
(74) *Attorney, Agent, or Firm* — Dawn-Marie Bey; Bey & Cotropia PLLC

(57) ABSTRACT

A method for injecting metadata into an existing artifact is described. The method generates metadata related to an existing artifact having a predetermined structure and encodes the metadata in accordance with the predetermined structure. The encoded metadata is embedded within the existing artifact in accordance with the predetermined structure and is delineated within the predetermined structure as one or more individual records. The artifact, including embedded metadata, is stored within a storage entity and is accessible to processes related to the artifact. Additional records may be generated and embedded over time, thus creating a timeline if event related to the artifact.

31 Claims, 5 Drawing Sheets

(56) References Cited

U.S. PATENT DOCUMENTS

| | | | | |
|---|---|---|---|---|
| 2019/0392001 A1* | 12/2019 | Carothers | .............. | G06N 3/049 |
| 2020/0019882 A1 | 1/2020 | Sunil et al. | | |
| 2020/0067789 A1 | 2/2020 | Bharat et al. | | |
| 2020/0097851 A1* | 3/2020 | Alvarez | ................ | G06F 16/242 |
| 2020/0160229 A1* | 5/2020 | Atcheson | .............. | G06N 20/00 |
| 2020/0177455 A1* | 6/2020 | Tkaczyk | .............. | G06F 16/162 |
| 2021/0073618 A1* | 3/2021 | Boussarov | ............. | G06N 3/045 |
| 2021/0107141 A1* | 4/2021 | Shrivastava | .............. | G06F 8/71 |

OTHER PUBLICATIONS

Popp, Matthias. Comprehensive support of the lifecycle of machine learning models in model management systems. MS thesis. 2019. (Year: 2019).*

Drori, Iddo, et al. "Automl using metadata language embeddings." arXiv preprint arXiv:1910.03698 (2019). (Year: 2019).*

"From Data to Metadata For Machine Learning Platforms" [online], May 15, 2020 [retrieved on Jul. 23, 2020], Inside BigData, 7 pp., Retrieved From the Internet: https://www.printfriendly.com/p/g/WLj9gV.

Jim Dowling, "Guide to File Formats For Machine Learning: Columnar, Training, Inferencing, and the Feature Store" [online], Oct. 25, 2019 [retrieved on Jul. 23, 2020], Towards Data Science, 15 pp., Retrieved From the Internet: https://towardsdatascience.com/guide-to-file-formats-for-machine-learning-columnar-training-inferencing-and-the-feature-store-2e0c3d18d419.

"MinIO Quickstart Guide" [online], [retrieved Aug. 10, 2020], 8 pp., Retrieved From the Internet: https://docs.minio.io.

Tal Joffe, "SQL Query Engines—Intro and Benchmark" [online] Nov. 1, 2019 [retrieved on Aug. 10, 2020], 8 pp., Retrieved From the Internet: https://medium.com/nmc-techblog/sql-query-engines-intro-and-benchmark-44a658b47810.

Iker, "BigData SQL Query Engine Benchmark" [online], Jun. 25, 2018 [retrieved on Aug. 10, 2020], 9 pp., Retrieved From the Internet: https://medium.com/@mitxino77/bigdata-sql-query-engine-benchmark-e8605f355464.

Alex Castrounis, Innoarchtech, "Python vs. R for AI, Machine Learning, and Data Science," published by O'Reilly Media, Copyright InnoArchiTech LLC 2020.

Alex Castrounis, Innoarchtech, "Production vs. Development AI and Machine Learning," published by O'Reilly Media, Copyright InnoArchiTech LLC 2020.

Alex Castrounis, Innoarchtech, "Advanced Analytics Packages, Frameworks, and Platforms," published by O'Reilly Media, Copyright InnoArchiTech LLC 2020.

"CX, Model Training Automation and the Feature Store Problem" [online], 2019 [retrieved on Aug. 26, 2020] O'Reilly Strata Data Conference 2019, New York, New York, 3 pp., Retrieved From the Internet: https://www.oreilly.com/library/view/oreilly-strata-data/9781492050681/video327509.html.

Danilo Sato, et al., "Continuous Delivery for Machine Learning—Automating the End-to-End Lifecycle of Machine Learning Applications" [online], Sep. 19, 2019 [retrieved on Aug. 25, 2020], 34 pp., Retrieved From the Internet: https://martinfowler.com/articles/cd4ml.html.

Microsoft, "MLOps: Model Management, Deployment, and Monitoring With Azure Machine Learning" [online], Mar. 17, 2020 [retrieved on Aug. 25, 2020], 9 pp., Retrieved From the Internet: https://docs.microsoft.com/en-us/azure/machine-learning/concept-model-management-and-deployment.

Sebastian Schelter, "On Challenges in Machine Learning Model Management," Amazon Research, Copyright 2018, 11 pp.

Ibm, "Managing Model" [online], Aug. 11, 2020 [retrieved on Aug. 25, 2020], 2 pp., Retrieved From the Internet: https://dataplatform.cloud.ibm.com/docs/content/wsj/analyze-data/ml-manage-models.html.

Google Cloud, "MLOps: Continuous Delivery and Automation Pipelines in Machine Learning" [online], Last updated Jul. 27, 2020 [retrieved Aug. 26, 2020], Retrieved From the Internet: https://cloud.google.com/solutions/machine-learning/mlops-continuous-delivery-and-automation-pipelines-in-machine . . . .

Matei Zaharia, "MLflow: A Platform for Managing the Machine Learning Lifecycle" [online], Jul. 17, 2018 [retrieved on Aug. 26, 2020], 10 pp., Retrieved From the Internet: https://www.oreilly.com/content/mlflow-a-platform-for-managing-learning-lifecycle/.

Jim Dowling, "MLOps With a Feature Store" [online], Mar. 5, 2020 [retrieved on Aug. 26, 2020], 15 pp., Retrieved From the Internet: https://towardsdatascience.com/mlops-with-a-feature-store-816cfa5966e9.

Eduardo Melo, "How to Accelerate DevOps With Machine Learning Lifecyle Management" [online], Apr. 9, 2019 [retrieved on Aug. 26, 2020], Microsoft Azure, Retrieved From the Internet: https://azure.microsoft.com/en-us/blog/how-to-accelerate-devops-with-machine-learning-lifecycle-nagement/.

Emmanuel Raj, "Robust and Scalable Machine Learning Lifecycle For a High Performing AI Team" [online], Dec. 20, 2019 [retrieved on Aug. 26, 2020], 7 pp., Retrieved From the Internet: https://www.tietoevry.com/en/blog/2019/12/robust-and-scalable-ml-lifecyle-for-a-high-performing-ai-team/.

Isaac Sacolick, "What is CI/CD? Continuous Integration and Continuous Delivery Explained" [online], Jan. 17, 2020 [retrieved on Aug. 26, 2020], 9 pp., Retrieved From the Internet: https://www.infoworld.com/article/3271126/what-is-cicd-continuous-integration-and-continuous-delivery-explained.html.

Microsoft, "DevOps For a Data Ingestion Pipeline" [online], Jun. 23, 2020 [retrieved on Aug. 26, 2020], 16 pp., Retrieved From the Internet: https://dofcs.microsoft.com/en-us/azure/machine-learning/how-to-cicd-data-ingestion.

Alex Breshears, "Introducing MLOps and SDX For Models in Cloudera Machine Learning" [online], May 6, 2020 [retrieved on Aug. 26, 2020], 17 pp., Retrieved From the Internet: https://blog.cloudera.com/introducing-mlops-and-sdx-for-models-in-cloudera-machine-learning.

Lakshmi Randall, "Together, Metadata and Machine Leaning Can Help Automate Data Integration" [online], Oct. 12, 2017 [retrieved on Aug. 26, 2020], 13 pp., Retrieved From the Internet: https://thenewstack.io/using-metadata-machine-learning-drive-integration-automation/.

Matthew Arnold, et al., "Towards Automating the AI Operations Lifecycle," Mar. 28, 2020, MLOps Workshop at MLSys 2020, arXiv: 2003.12808v1, 6 pp.

Hewletter Packard, "HPE EZMERAL ML OPS" [online], [retrieved on Aug. 26, 2020], 9 pp., Retrieved From the Internet: https://www.hpe.com/us/en/solutions/machine-learning-operations.html.

Jingyan Jiang, et al., "BACombo—Bandwidth-Aware Decentralized Federated Learning," Electronics 2020, 9, 440, doi: 10.3390/electronics9030440, Feb. 2, 2020, 15 pp.

D. Sculley, et al., "Hidden Technical Debt in Machine Learning Systems," NIPS '15, Proceedings of the 28th International Conference on Neural Information Processing Systems, vol. 2, pp. 2503-2511, Dec. 2015.

"2020 State of Enterprise Machine Learning," Algorithmia, Inc., Copyright 2019, 29 pp.

Matthias Popp, "Comprehensive Support of the Lifecycle of Machine Learning Models in Model Management Systems," Master Thesis, Institute of Parallel and Distributed Systems, University of Stuttgart, Commenced: May 4, 2019, Completed: Nov. 4, 2019, 71 pp.

Sebastian Schelter, et al. "Automatically Tracking Metadata and Provenance of Machine Learning Experiments," Machine Learning Systems Workshop at NIPS 2017, Long Beach, CA, USA, 8 pp.

Canadian Examination Report for Application No. CA 3,124,812, dated Nov. 23, 2023, 7 pp.

Indian Examination Report for Application No. 202144030387, dated Mar. 15, 2022, 5 pp.

Indian Hearing Notice for Appplication No. 202144030387, dated Jan. 16, 2024, 2 pp.

European Search Report for Application No. EP 21 19 2260, dated Jan. 24, 2022, 8 pp.

* cited by examiner

| protobuf Record | protobuf Record |
| --- | --- |

Figure 1a
Prior Art

| Model | Summary Data |
| --- | --- |

Figure 1b
Prior Art

| $R_1$ | $R_2$ | $R_3$ | $R_4$ | $R_5$ |
|---|---|---|---|---|
| Structured Accession Data | Semi-Structured Data | Model | Accession Data | Summary Data |

Figure 2a

| $R_6$ | $R_7$ | $R_8$ | $R_9$ | $R_{10}$ | | $R_N$ |
|---|---|---|---|---|---|---|
| Structured Data | Structured Data | Accession Data | Other Data | Model | | |

Figure 2b

METHOD FOR DECENTRALIZED ACCESSIONING FOR DISTRIBUTED MACHINE LEARNING AND OTHER APPLICATIONS

FIELD OF THE TECHNOLOGY

The present embodiments are generally directed to integration of metadata generated during processing of artifacts within the original artifact structure.

BACKGROUND

Machine Learning Operations, (MLOps), is a growing field for automation and governance of ML (Machine Learning) technology, and data/model artifacts. Existing implementations of MLOps are overly influenced by the notion of centralized control. Centralized control results in pipelines for creation and delivery of artificial intelligence (AI) capabilities that require many components and complex services and are expensive to maintain and operate. In the document entitled 2020 state of enterprise machine learning (Algorithmia, 2019), survey results indicated that there was an unreasonably long road to deployment of ML models by organizations due to a variety of factors including time lost to infrastructure tasks. Without deployment, there is no business value return to companies that invest in ML. Some identified challenges to deployment include versioning and reproducibility.

Automated MLOps solutions in their current embodiments are a combination of multiple technologies each bringing an existing legacy design which are then customized to fit the needs of ML services and applications. This results in metadata storage being decoupled from the pipeline and each process and component of the pipeline needing to be independently integrated. Consequently, the store of metadata is not integrated into artifacts and other digital assets resulting in chain of custody issues for models, and loss of valuable governance information when models are isolated from the metadata store. Decoupled metadata stores are a common feature of contemporary offerings, for example, KubeFlow and MLFlow utilize an independent metadata layer not only in a logical, or abstract sense, but also in their physical implementations.

SUMMARY OF CERTAIN EMBODIMENTS

In a first exemplary embodiment, a method for injecting metadata into an existing artifact, including: generating metadata related to an existing artifact, wherein the existing artifact is embodied in a predetermined structure; encoding the metadata in accordance with the predetermined structure; embedding the metadata within the existing artifact in accordance with the predetermined structure, wherein the embedded metadata is delineated within the predetermined structure as one or more individual records; and storing the artifact with embedded one or more individual records in a storage entity.

In a second exemplary embodiment, a method for injecting metadata generated during one or more processes related to a model into an existing artifact to create an audit trail, includes: generating first metadata related to an existing artifact during a first process, wherein the existing artifact is embodied in a predetermined structure; encoding the first metadata in accordance with the predetermined structure; embedding the first metadata within the artifact in accordance with the predetermined structure, wherein the embedded first metadata is delineated within the predetermined structure as a first individual record; storing the existing artifact with embedded first individual record in a first storage entity; generating second metadata related to the existing artifact during a second process; encoding the second metadata in accordance with the predetermined structure; embedding the second metadata within the existing artifact in accordance with the predetermined structure, wherein the embedded second metadata is delineated within the predetermined structure as a second individual record; and storing the existing artifact with embedded first and second individual records in a second storage entity.

In a third exemplary embodiment, method for automating access to and use of artifact-related metadata from one or more sources by one or more processing frameworks, includes: generating metadata related to an existing artifact, wherein the existing artifact is embodied in a predetermined structure; encoding the metadata in accordance with the predetermined structure; embedding the metadata within the existing artifact in accordance with the predetermined structure, wherein the embedded metadata is delineated within the predetermined structure as one or more individual records; storing the artifact with embedded one or more individual records in a first source, wherein the first source includes a storage entity with an associated query engine for receiving queries related to the artifact including the metadata embedded therein, and further wherein the storing results in creation of storage entity metadata associated with the artifact; and providing by the query engine, a notification regarding a change to one or more of the artifact, including changes to the metadata embedded therein and changes to the associated storage entity metadata; wherein receipt of the notification triggers an action related to the artifact responsive to an indication of a change.

In a fourth exemplary embodiment, at least one computer-readable medium storing instructions that, when executed by a computer, perform a method for injecting metadata into an existing artifact, the method includes: generating metadata related to an existing artifact, wherein the existing artifact is embodied in a predetermined structure; encoding the metadata in accordance with the predetermined structure; and embedding the metadata within the existing artifact in accordance with the predetermined structure, wherein the embedded metadata is delineated within the predetermined structure as one or more individual records; storing the artifact with embedded one or more individual records in a storage entity.

BRIEF SUMMARY OF FIGURES

The embodiments will be described below and reference will be made to the figures, in which:

FIGS. 1a and 1b illustrate prior art file structure and file content for artifact models;

FIGS. 2a and 2b illustrate exemplary artifact model files including chains records containing metadata generated during processing of an artifact model in accordance with an exemplary embodiment;

DETAILED DESCRIPTION

Figure 3:
FIG. 3 illustrates an exemplary processing entity framework in accordance with preferred embodiments herein for metadata record injection to generated and/or processed artifacts.
Figure 3:
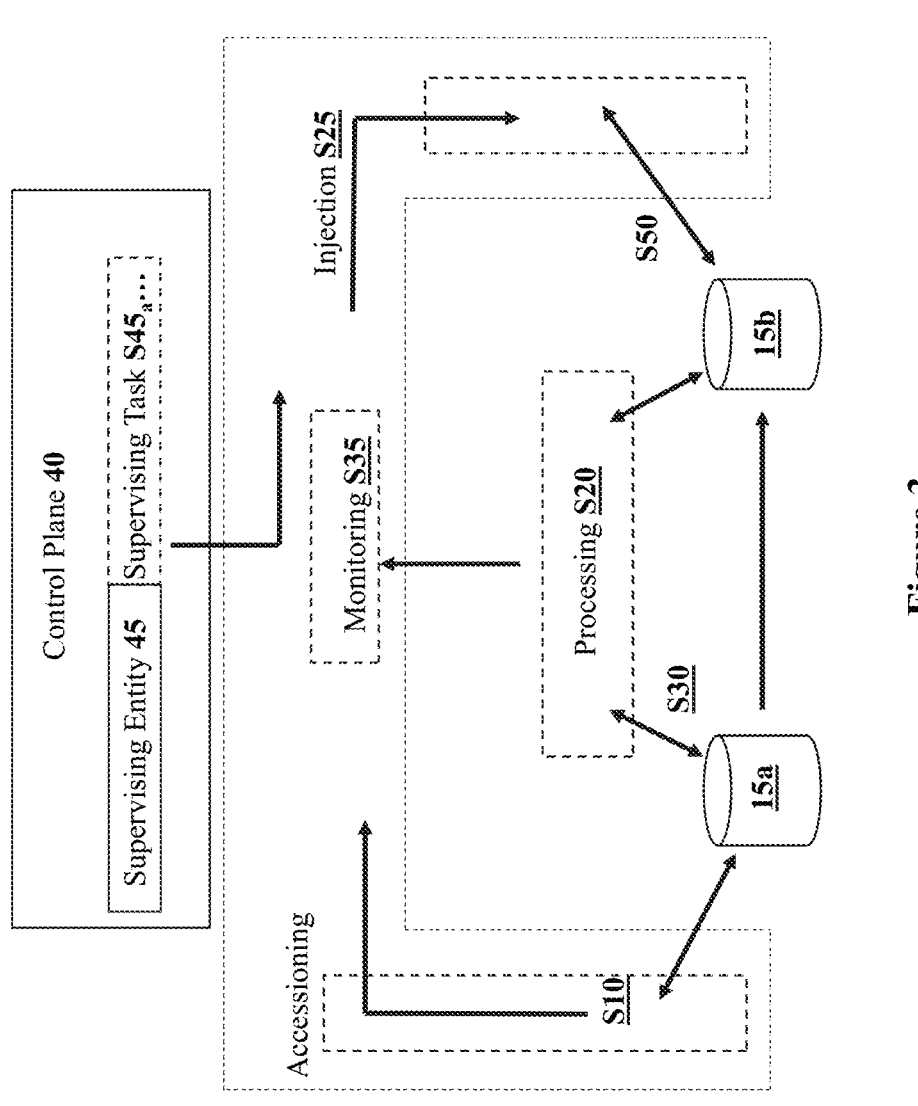

The following terms and definitions are used herein to describe the present embodiments:

Accession(ing) (or inject(ing)): process of increasing by addition (as to a collection or group). In the embodiments herein, this applies to, moving data or information to a format that includes the original representation of data or information and potentially additional records or information describing the source of the un-accessioned raw data. This also applies to the creation of an artifact that could contain a reference to an external source of data or information using a reference.

Accessioned data: Any data or other digital information that is being treated as artifact, or description of an artifact that has become a managed entity and participates in, or is associated with a process, experiment, or pipeline.

Artifact: Digital entity comprised of any structured, or well-formed digital information including examples such as data, code, machine learning model(s), parameters, loss metrics and model benchmarking information among other items used during the creation, or resulting from the creation, or any other processing related to the artifact. Artifacts can also be an intermediate product generated or used in creating the artifact, or any structured information, media or a combination of the same that might be related to the artifact. Artifacts can contain metadata related to processing performed on or using other digital information it contains, or descriptive of the other digital information they contain, for example, a schema.

Model artifacts: An artifact primarily, but not exclusively, comprised of model data and a prediction, classification or other algorithm.

Arbitrary artifacts: Any artifact used by or associated with a ML operation or process.

Artifact structures: Any well-formed data structure encoded and embedded within an artifact.

Augment/Augmentation: A process by which well-formed metadata or other information is added to an existing artifact as an embedded component of the artifact.

Code: The implementation of ML algorithms (procedures) that are run on data, or artifacts.

Data: Any ML experiment specific accessioned, unaccessioned ad-hoc digital information, or formally defined dataset(s). Data can be used for, but not limited to, model training and evaluation and associated metadata including, but not limited to location pointers, name and version, column name and types.

Data store: a repository for persistently storing and managing collections of data which include not just repositories like databases, but also simpler store types such as simple files, blobs etc.

Data structure (data format): data organization, management, and storage format that enables efficient access and modification. A data structure is a collection of data values, the relationships among them, and the functions or operations that can be applied to the data.

Embed: The process of taking well-formed and encoded digital information, including components of, or entire artifacts and bundling them into new, or existing artifacts.

Encode: The process of taking digital information that is well formed and formatting it into a form appropriate for transmission between processes or persisting it in a manner such that it can be reconstituted for processing.

Well-formed: Well-formedness is the quality of digital information or other encoded entity that conforms to the norms of the computer system of which it is a part of, or the standard processes and encoding of the software and hardware domain in which it is to be found. In the context of the present embodiments, metadata is embedded into the domain of the system performing ML processing rather than being separate and not conforming to the norms of ML processing.

Entities (Processing entities): A collection of discrete entities each performing a function within a larger sequence process.

Machine learning system (or Machine learning framework): a collection of one or more entities such as an interface, library or tool for facilitating building (training), tuning, or processing of machine learning models encompassing the use, and optionally the storage, of input data and/or artifacts.

Metadata: encompasses data-related information (see Data above) including by way of example: information about datasets, executions, features; models, and other artifacts; model type including class of algorithm; and hyperparameters used during model training; information about processing steps. Metadata can describe either structured or unstructured data. The format of metadata can be defined by a Data structure, using a schema, data definition language, or interface definition language.

Machine learning model: A file comprising encoded elements such as model data and one or more prediction, classification or other algorithm(s).

Model: The representation of what a machine learning system has learned from the training data.

Model Training: Process of determining the mathematical manipulations needed to arrive at known output given a known input for a larger number of cases, also known as training data.

Records: A collection of structured data items, for example metadata, that have been serialized and are embedded in an artifact using an artifact structure encoding.

The present embodiments describe a system and method whereby an MLOps ecosystem is based around the process of embedding model, and other metadata within a model artifact. This direct embedding removes the need for centrally controlled infrastructure such as an independent metadata store.

The present embodiments rely upon the ability for machine learning models to contain metadata that is stored within the existing data structure provisioned by the machine learning system to store models and other artifacts specific to its implementation or permitted by its extensibility. Two important reasons for storing metadata from machine learning experiments are comparability i.e. the ability to compare results across experiments, and reproducibility. And beyond the experimental phase of the ML pipeline, access to metadata can provide invaluable information and insights to assist with maximizing value from ML models as described in From Data to Metadata for Machine Learning Platforms, Inside BIGDATA, May 15, 2020 (online).

Examples of existing data encoding formats used with existing machine learning model file formats include protocol buffer file (.pb file extension) used with the TensorFlow framework and the ONNX model file format (.onnx file extension). One skilled in the art recognizes that other model format files that support user-defined payloads embedded with models may also be used. A description of other such formats can be found in Guide to File Formats for Machine Learning: Columnar, Training, Inferencing, and the Feature Store, Towards data science, Oct. 25, 2019 (online).

FIGS. 1a and 1b show traditional artifact structures with records appended to each other. For each traditional artifact structure, the included records are generally predetermined by what is supported by a single processing step using the file type, e.g., a model training processing step, and its application of protobuf records, per FIG. 1a with contents being limited to the artifact, e.g., model type and perhaps a summary, as shown in FIG. 1b. Artifacts are implemented as blobs, files, or individually addressable items in a data store. Existing artifact structures have not been used to store additional information records related to the artifact, or to any general processing within the artifact structure itself.

In the present embodiments, metadata records are added to the artifact structure and accumulated over time, creating an audit trail of the processing performed with and on any other information stored within the same artifact. By way of example, FIGS. 2a and 2b illustrate exemplary chains of records within the same artifact structure (FIG. 1a). For example a first chain of records in FIG. 2a could include the standard model information generated by the trainer ($R_3$, $R_5$) followed by records related to the training activity such as time it was performed, loss or fitness information, then this could be followed by records generated when the model was being served including confidence intervals of the predictions, events recording where the model was copied to and when and where it was used, as some examples ($R_1$, $R_2$, $R_4$). Similarly, a second chain of records in FIG. 2b includes various records including structured ($R_6$, $R_7$), accession ($R_8$) and other data ($R_9$), as well as model data ($R_{10}$).

The present embodiments implement storage of additional records within artifacts; not in a separate location or separate database. Artifacts are intended to expose their records as serially accessible or organized as a randomly accessible set of records as exemplified using a BTree, Heap or similarly structured indexed hierarchy.

Additional records are injected into an artifact to represent the accessioning of data input(s) and output(s), code and executions, and processing that have been triggered for an artifact and relevant contextual information. In addition, new information concerning existing related artifacts are also added as new records. The purpose of the injection of records into an artifact is that once any new additional contextual information, for example the point in time processing was done and the nature of any transformation or addition of new data or algorithms, for the model or processing of the model have been added to the artifact, the existing records remain unchanged; thus, creating a comprehensive record or audit trail of past states (testing, production, superseded), facts (parameters, tuning variables, any variable influencing or related to any process in which the artifact is directly involve or implicated with) and actions, execution of logic or code that either directly or indirectly is related to or consumed by the actions. Additionally, if the other portions, such as data, or metadata, or audit trail records, of an artifact, which may be opaque to the embodiments described herein, are modified, then the metadata currently stored, remains intact, and updated metadata is appended to the artifact representing the latest state of the artifact and the most recent actions performed on it.

One skilled in the art recognizes that if a process, such as a training step, is repeated to incorporate new data that additional model data could be appended to the artifact along with new related records logically replacing the previous model. In this manner model data regenerated as a result of drift can be stored within the artifact along with previous versions.

Further, while the internal structure of the accession data, or metadata stored within an artifact is extensible for machine learning applications, one aspect of this metadata that should be noted is the presence of an optional header that can be implemented as a monotonically increasing hash to both uniquely identify other records also present within the artifact or present within other artifacts and to allow a time-based ordering to be honored when reading out the data. This facilitates reconstruction of the timeline in which specific actions have occurred as well as state and identification of which data was present, and what version of a model, or other encoded records were present and in effect when the actions occurred.

Further, additional records that should be noted are the additions of fingerprint(s), or hash(es) uniquely identifying either data, metadata or other audit trail records as a means of both identifying the records or asserting their integrity. Further, records pertaining to digital signatures, or encryption and hybrid-encryption related records used for data confidentiality, and also non-repudiateable digital signature of other records.

Accordingly, the present embodiments store key identifying input and output information from all steps within an operations-based process and thus can be relied on solely as its single source of truth.

A detailed discussion of implementation of the embodiment summarized above is provided below.

Referring to FIG. 3, in a first exemplary embodiment of the method for in situ metadata storage, anytime that a model is first created (trained), all inputs to the initial model creation process, including both data and code as well as references to datasets used during training and their identity or location, are scanned, and a digital fingerprint is generated using a hash sufficient to uniquely identify the individual input as separate records within the model artifact structure. By way of example, a IPython or Jupyter notebook is an interactive computational environment, in which you can combine code execution, rich text, mathematics, plots and rich media to represent a model. FIG. 3 represents, generally, processing entity framework 5. This is part of the initial accessioning step S10. Alternatively, fingerprints can be produced for none, one, or more of the records within an artifact, e.g., the data, the code and the model, as discrete pieces of information. Records can be added to support digital signing of existing records already encapsulated within the artifact. Along with any other metrics, hashes describing content, external metadata and the like. The identifying fingerprint and the unique storage location or address or identifying resource location for the input, among other available metadata already stored within the artifact or that is being added to the artifact records, it then becomes part of the model metadata within the artifact record chain. This process is referred to as accessioning and can occur multiple times on a single artifact as additional processing occurs that contributes new state information, data, metadata, or audit trail records. The initial record chain in the model artifact structure with embedded metadata records is stored in an appropriate storage entity, e.g., locally attach disk, or a storage platform such as a blob store 15a, 15b. Although two storage entities are shown, one skilled in the art recognizes that these are merely representative. One or more storage entities may be used.

After initial creation/training, models may be subject to different and on-going processing steps by one or more processing entities. Because the model artifact, including metadata inputs and outputs, change over time, due to processing, e.g., retraining and transfer learning for example, and in space, i.e., where models are stored, revised, shared, and deployed, the accessioning process can be viewed as occurring potentially continuously, and/or iteratively, through time. This can be referred to as reaccessioning or continued accessioning with respect to the existing artifact, e.g., model artifact in our primary example. During this processing (S20), the processing entities which are performing the one or more processing steps, e.g., retraining, executing, producing, sharing, saving, may generate or transform the model in different ways and generate new outputs including characterizations, parameters and implementation of behaviors intrinsic to the processing, resulting from the processing S20. Processing is referred to generally, but may include numerous individual processing steps, performed by different processing entities (instrumented and un-instrumented).

Further still, additional types of information may result from individual processing steps, including the identity of any hardware and/or software resources used during processing, the time taken to perform processing, the software manifest present during processing, metrics observed during processing such as fitness, and the like.

Further to the processing S20, in embodiments where one or more processing steps are performed using processing entities that are not instrumented to support direct artifact accessioning, a supervising entity 45 may be used to augment any artifacts referenced, produced, or modified using extensible formats that are present during the processing step with the metadata on behalf of the un-instrumented processing entity. The supervising entity also gathers the behaviors and metadata generated by instrumented processing entities. Thus, all metadata generated by both instrumented and un-instrumented processing entities during processing can be collected and injected into the appropriate artifact model structure in the form of added records as discussed above. The implementation of the injection S25 of new records to both existing and new artifacts, as detailed in the previous examples, in the presence of a supervising entity 45, is implemented after processing. The metadata and artifacts generated (and updated) during initiation and processing can be accessed from one or more storage entities 15a, 15b for injection to the appropriate artifact structure as records. Subsequently, the artifact record chains can be uploaded for storage and use S50.

Additionally, for particular processing steps that are not understood by the supervising entity 45, an instrumented processing entity could inject its own metadata that describes its processing step and is specific thereto directly to the model artifact structure. And in an extension S30 to this process, any artifact externally referenced can be copied to storage 15 local to the artifact's processing step and operated on directly. Once processing has been completed, changes to the artifact made by the artifact processing are then prepared by the supervising entity 45 for upload and combined with metadata available to the supervising entity 45 and injected prior to any uploads.

Accessioned artifacts can also contain information about the relationships between different artifacts, including artifacts containing models, allowing an audit trail to be accrued over a long period of time to measure any drift or other model monitoring metrics to track changes between attempts to adapt models in response to observations made in their operational environment, for example during training, and inference. An example of such monitoring S35 could include recording trends in confidence interval changes for predictions as models are applied overtime in a changing environment, and new models are evolved. This information could assist, for example, in answering questions related to how long models stay relevant to the predictions they are being asked to make and what the rate of needing to do model retraining is for example.

Further, the presence of a control plane 40 to orchestrate the supervisor task(s), e.g., S45$_a$, performed by the supervising entity 45 can also contribute new metadata, e.g., experiment-related metadata, for injection S25 into artifacts, by the supervising entity 45. As will be understood by one skilled in the art, a chain of processing steps would then result in the continual addition of metadata to artifacts, building a history of the processing lifecycle in its entirety, at all steps. By way of example, metadata related to evolutionary or model training for both the architecture evolution phase and for both traditional machine learning and evolutionary learning of the calculation of desirable weights step may be injected into the same model artifact structure.

In a follow-on embodiment, a process and system facilitate synchronization of both arbitrary artifacts as well as model artifacts with a store of a plurality of artifacts in an automated fashion. During this synchronization process, the stored artifact metadata is made accessible to a query engine. Examples of query engines include Hive, Presto, Spark SQL and Snowflake to be used with storage entities (e.g., 15a, 15b) for storing the artifact metadata, arbitrary and model, which include S3 Athena, MinIO Select and the like. Other compliant storage platforms, and document or object databases, and data structure query engines such as would apply to protobuf and other forms of semi-structured data may be implemented as part of this embodiment. The following articles are descriptive of particular components, set-ups and implementations which may be considered by one having ordinary skill in the art and are incorporated herein by reference in their entireties: MinIO Quickstart Guide downloaded on Aug. 10, 2020; Joffe, SQL Query Engines—Intro and Benchmark, Medium: Nielsen Tel-Aviv Technical Blog (posted Nov. 1, 2019); Iker, BigData SQL Query Engine benchmark, Medium (posted Jun. 25, 2018).

The query engine facilitates the automation aspect of the present follow-on embodiment wherein one or more autonomous entities (or instantiations of the same entities) can access and use metadata from one or more sources to both trigger and inform processing, and potentially create and/or change artifacts and associated metadata.

Artifact metadata has two distinct types, one being internal to the artifact which is the metadata described herein (also referenced herein as internal metadata), and the second is the metadata stored within the storage entity that houses artifacts (referenced herein as "storage entity metadata"). The storage entity metadata housed within the storage entity includes, but is not limited to, items such as the artifact's ID, a checksum for the artifact and additional custom or proprietary metadata a user wishes to add at the point of storage.

Processing entities for artifacts are exemplified by processes including training, serving models for inferencing, and/or providing governance functions to human users who wish to monitor model artifacts.

Processing can be triggered as a result of observation of the storage entity metadata signaling to the supervising entity the creation of artifacts and/or changes made to artifacts by a processing entity. The observation may come from received notifications, e.g., supervising entity is always listening for signals, or responses to explicit polling queries (e.g., SQL queries) from the supervising entity. Alternatively, the internal metadata within the artifact, or its extracted representation, can also either be queried in a polling fashion by processing entities, and any indicated changes can be used to trigger actions within those processing entity frameworks set to use change notifications to artifacts being processed thereby.

Figure 4:
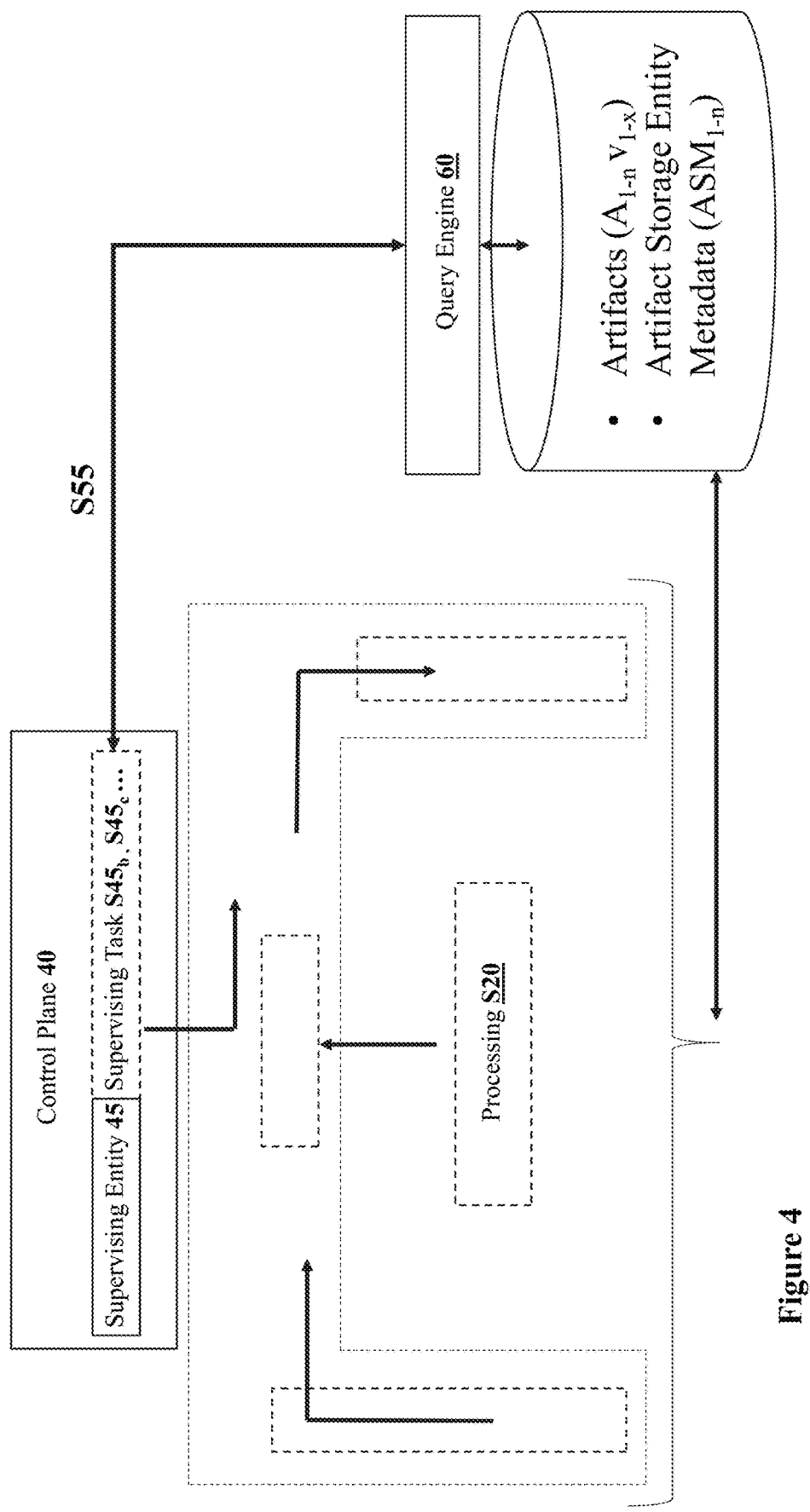
FIG. 4 illustrates an exemplary processing entity framework and query engine for facilitating autonomous sharing and updating of artifact metadata across frameworks.

In this follow-on embodiment, exemplified in FIG. 4, a process specification of a processing entity framework 5 provides for the processing available under the framework as per FIG. 3, which includes, for example, one or more of the exemplary processes discussed above for receiving, generating and/or updating machine-learning and AI-related artifacts ($A_{1-n}$) which may be stored in one or more databases, or storage platforms 15 and updated therein in accordance with version-control ($A_{1-n}$ $v_{1-x}$). The supervising entity 45 of a processing entity framework 5 includes a function S55 for receiving notifications or receiving responses to polling inquiries (e.g., SQL queries) $S45_b$ from one or more database, or storage platforms 15 via a query engine 60, of the existence of new versions of one or more existing artifacts and/or a new artifacts. The supervising entity 45 then extracts the metadata from the artifact(s) and presents the extracted metadata to the query engine $S45_c$, which performs indexing and other maintenance operations in order to make the artifact'(s) metadata accessible to other entities via other processing entity frameworks or other instantiations of the same framework.

Figure 5:
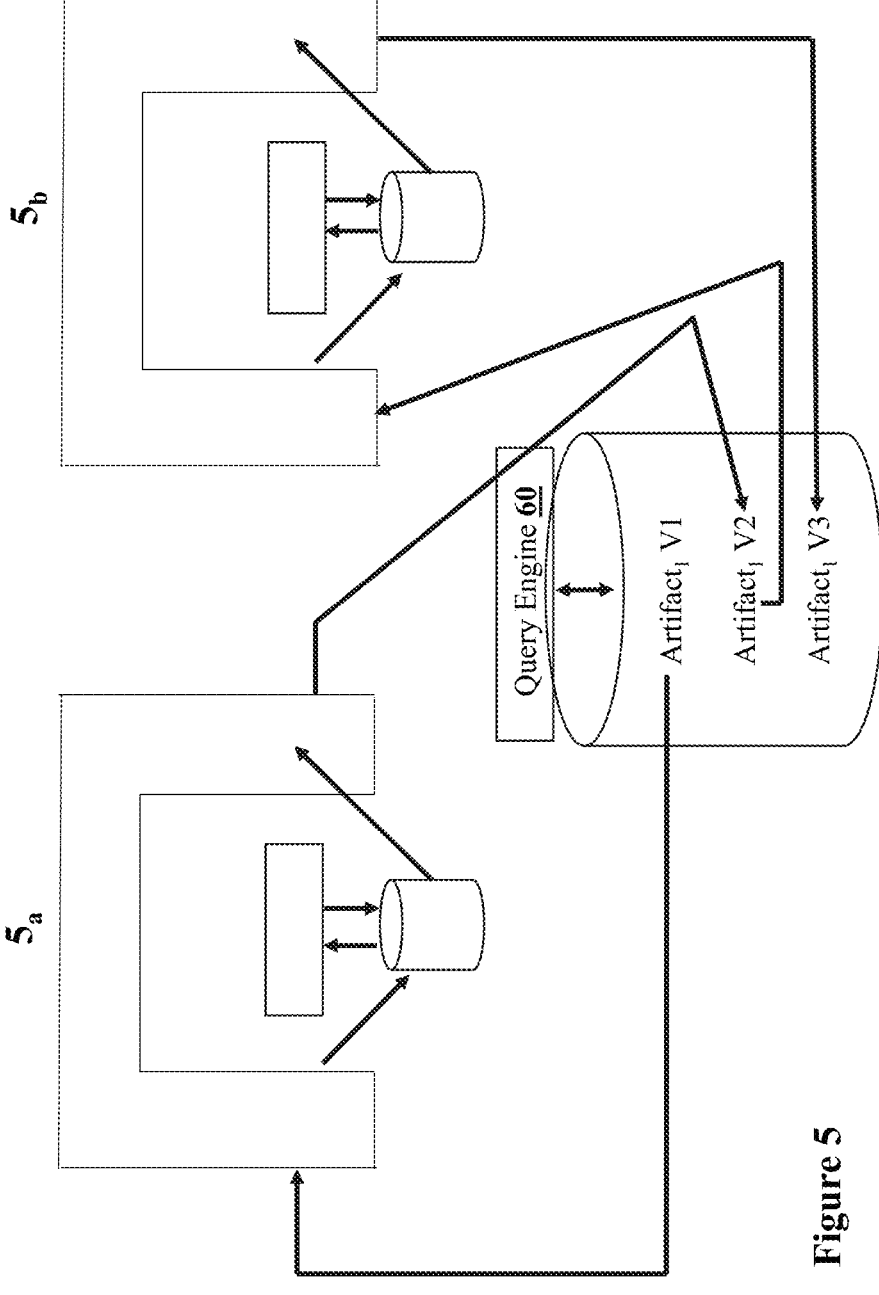
FIG. 5 illustrates a chain of entities processing artifacts using the query engine of FIG. 4.

As described above and shown in FIG. 5, a chain of entities processing artifacts, i.e., processing entity frameworks $5_a$, $5_b$ . . . $5_x$ can form the functional equivalent of a pipeline without having to explicitly chain the processing steps together. As illustrated, the original artifact version, i.e., Artifact$_1$ V$_1$, is input to the processing entity framework $5_a$ and in accordance with processing performed by processing entity framework $5_a$, new metadata is produced and new metadata records are injected to the artifact structure, producing artifact version 2, i.e., Artifact$_1$ V$_2$. Next, Artifact$_1$ V$_2$ is input to the processing entity framework $5_b$ and in accordance with processing performed by processing entity framework $5_b$, new metadata is produced and new metadata records are injected to the artifact structure, producing artifact version 3, i.e., Artifact$_1$ V$_3$. Each artifact version can be saved successively in a database 15 in accordance with known versioning methods. The processing entity frameworks $5_a$, $5_b$ . . . $5_x$ can be different frameworks with different individual processing entities or they can be the same framework, with the same processing entities operating at a different time (e.g., individual experiment instantiations, runs).

One specific example of the method described herein, is application to a generational learning experiment typical of evolutionary learning where individual experiments can be dispatched in a fire and forget manner. As evolutionary learning progresses, each experiment produces a model that is injected with fitness scores, among other metadata, using the method discussed above. Each of these experiments results in metadata appearing within models as they are uploaded into the storage service. Metadata queries that happen to be streaming, or running, will now begin returning more information about the progress of the generation to entities subscribing to the data, or conversely, notifications will be generated that contain new artifacts including models with fitness annotations, as described herein. In the case of queries, this can include both streaming queries and queries run on a schedule to check the status of the generation against the storage system and artifact metadata. Once the required number of individuals, or experiments, have produced fitness scores, an independently operating entity is triggered as a result of a streaming query being satisfied. Alternatively, an entity that is polling the query observes the criteria is satisfied and commences processing the metadata of the results and initiating its own processing, for example triggering a new generation or selecting the top scoring model and annotating it as such, using metadata. Subsequently another independently operating entity observes the addition of the top scorer, or winner, metadata and then processes the artifact for quality assurance ("QA") purposes, thus again adding new metadata, and then uploading the updated artifacts. Listening entities observe the change notifications, or seeing new query results, with the new metadata, are aware of the artifact(s) readiness for a canary deployment for example, repeating the cycle. One skilled in the art recognizes that this description does not preclude having entities orchestrated using a single complex of services or hosted within a single entity.

The embodiments described herein provide for a method by which individual AI tools can inject or accession metadata into AI artifacts, one exemplary AI artifact being models, without needing AI-based code to do this directly. Thus, the embodiments address the issue of maintaining or having multiple sources of truth within an AI ecosystem.

The embodiments also describe a data store consisting of a database or storage platform with associated query engine that can query against the embedded metadata within models allowing for workflow automation and for discrete components to discover and operate against data. This enables workflows to exist without the need for deeply coupled pipelines moving data between processing stages etc.

Additional advantages resulting from the embodiments described herein are numerous. An artifact is never separated from the description and specification of both, its past in lifecycle terms and future actions to be taken related to it. The source from which the artifact was derived, as well as assets (electronic or otherwise) can be encoded into the model. Any artifact can be annotated by processing steps in one or more lifecycles. Also, metadata can be injected (accessioned) automatically by a processing step without intervention needed by users or owners of the data. Cryptographic signatures can be used to create non-repudiation of processing steps the model has transited, one example being approvals, as well as promotions related to the model, automated or otherwise.

Further, implementors of ML/EL (Evolutionary Learning) training do not need to add code to their experiments for accessioning information to be injected into models related to the experiment parameters, source data and other information important for governance. Information injected can be anything of significance to the processing step or from the supervising entity including, for example, fitness scores along with the URLs, and cryptographic hash digests to identify the software used to generate the fitness score, and materials used during computation of the artifact that are related to ML or EL system.

Creating workflows for AI artifacts is done via the use of freestanding software performing queries against the models stored by a database, or storage platform as exemplified by a blob or file store. This also allows for a model to become secure to prevent tampering using signatures, non-repudiation for actions made to or with the model via authenticated signatures, and secure access to appropriately authorized individuals who possess encryption keys as some examples.

It is submitted that one skilled in the art would understand that various computing environments, including computer readable mediums, which may be used to implemented the methods described herein. Selection of computing environment and individual components may be determined in accordance with memory requirements, processing requirements, security requirements and the like. It is submitted that one or more steps or combinations of step of the methods described herein may be developments locally or remotely, i.e., on a remote physical computer or virtual machine (VM). Virtual machines may be hosted on cloud-based IaaS platforms such as Amazon Web Services (AWS) and Google Cloud Platform (GCP), which are configurable in accordance memory, processing, and data storage requirements. One skilled in the art further recognizes that physical and/or virtual machines may be servers, either stand-alone or distributed. Distributed environments many include coordination software such as Spark, Hadoop, and the like. For additional description of exemplary programming languages, development software and platforms and computing environments which may be considered to implemented one or more of the features, components and methods described herein, the following articles are reference and incorporated herein by reference in their entirety: Python vs R for Artificial Intelligence, Machine Learning, and Data Science; Production vs Development Artificial Intelligence and Machine Learning; Advanced Analytics Packages, Frameworks, and Platforms by Scenario or Task by Alex Castrounis of Innoarchtech, published online by O'Reilly Media, Copyright InnoArchiTech LLC 2020.

The invention claimed is:

1. A computer-implemented method for injecting metadata into an existing machine learning process artifact comprising:

generating metadata related to an existing machine learning process artifact during one or more processes related to the existing machine learning process, wherein the existing machine learning process artifact is embodied in a predetermined structure and further wherein the metadata is generated at multiple distinct times;

encoding the metadata at each distinct time in accordance with the predetermined structure; and embedding the metadata at each distinct time within the existing machine learning process artifact in accordance with the predetermined structure, wherein the embedded metadata at each distinct time is delineated within the predetermined structure as a separate individual record;

storing the existing machine learning process artifact with embedded separate individual records in a storage entity after each distinct time as a distinct version.

2. The computer-implemented method according to claim 1, wherein the processes related to the existing machine learning process artifact are selected from a group consisting of creating, duplicating, training, serving, deploying, producing, storing and using the existing machine learning process artifact.

3. The computer-implemented method according to claim 1, wherein the separate individual records containing the metadata are injected into the existing machine learning process artifact over time to create an audit trail.

4. The computer-implemented method according to claim 3, wherein the separate individual records are injected sequentially to the existing machine learning process artifact over time.

5. The computer-implemented method according to claim 1, wherein the one or more processes are performed by one or more processing entities selected from a group consisting of instrumented and un-instrumented processing entities.

6. The computer-implemented method according to claim 5, wherein metadata generated by a process performed by an instrumented processing entity is encoded and embedded within the existing machine learning process artifact by the instrumented processing entity.

7. The computer-implemented method according to claim 5, wherein metadata generated by a process performed by an un-instrumented processing entity is collected by a supervising entity wherein the supervising entity encodes and embeds the metadata within the existing machine learning process artifact on behalf of the un-instrumented processing entity.

8. The computer-implemented method according to claim 1, wherein the existing machine learning process artifact is selected from a group consisting of data, code and model artifacts.

9. A computer-implemented method for injecting metadata generated during one or more processes related to a model into an existing machine learning process artifact comprising:

generating first metadata related to an existing machine learning process artifact during a first process, wherein the existing machine learning process artifact is embodied in a predetermined structure;

encoding the first metadata in accordance with the predetermined structure; and embedding the first metadata within the existing machine learning process artifact in accordance with the predetermined structure, wherein the embedded first metadata is delineated within the predetermined structure as a first individual record;

storing the existing machine learning process artifact with embedded first individual record in a first storage entity as a first updated version of the existing machine learning process artifact;

generating second metadata related to the existing machine learning process artifact during a second process;

encoding the second metadata in accordance with the predetermined structure;

embedding the second metadata within the existing machine learning process artifact in accordance with the predetermined structure, wherein the embedded second metadata is delineated within the predetermined structure as a second individual record;

storing the existing machine learning process artifact with embedded first and second individual records in a second storage entity as a second updated version of the existing machine learning process artifact.

10. The computer-implemented method according to claim 9, wherein the first and second process are selected from a group consisting of duplicating, training, serving, deploying, producing, storing and using the existing machine learning process artifact.

11. The computer-implemented method according to claim 9, wherein the first and second individual records containing the first and second metadata are injected into the existing machine learning process artifact at different times, thereby creating an audit trail related to the existing machine learning process artifact.

12. The computer-implemented method according to claim 9, wherein the first and second processes are performed by one or more processing entities selected from a group consisting of instrumented and un-instrumented processing entities.

13. The computer-implemented method according to claim 12, wherein first and second metadata generated by processes performed by an instrumented processing entity is encoded and embedded within the existing machine learning process artifact by the instrumented processing entity.

14. The computer-implemented method according to claim 13, wherein first and second metadata generated by a process performed by an un-instrumented processing entity is collected by a supervising entity wherein the supervising entity encodes and embeds the metadata within the existing machine learning process artifact on behalf of the un-instrumented processing entity.

15. The computer-implemented method according to claim 9, wherein the first storage entity and the second storage entity are the same storage entity.

16. The computer-implemented method according to claim 9, wherein the first storage entity and the second storage entity are different storage entities.

17. The computer-implemented method according to claim 9, wherein the existing machine learning process artifact is selected from a group consisting of data, code and model artifacts.

18. A computer-implemented method for automating access to and use of machine learning process artifact-related metadata from one or more sources by one or more processing frameworks, comprising:
   generating metadata related to an existing machine learning process artifact, wherein the existing machine learning process artifact is embodied in a predetermined structure;
   encoding the metadata in accordance with the predetermined structure;
   embedding the metadata within the existing machine learning process artifact in accordance with the predetermined structure, wherein the embedded metadata is delineated within the predetermined structure as one or more individual records;
   storing the existing machine learning process artifact with embedded one or more individual records in a first source at a first time, wherein the first source includes a storage entity with an associated query engine for receiving queries related to the existing machine learning process artifact including the metadata embedded therein, and further wherein the storing results in creation of storage entity metadata associated with the existing machine learning process artifact wherein the storage entity metadata is encoded in accordance with the predetermined structure of the existing machine learning process artifact, embedded within the existing machine learning process artifact and stored as part of the existing machine learning process artifact as an individual record in the first source at a second time;
   providing by the query engine, a notification regarding a change to the existing machine learning process artifact, including changes to the metadata embedded therein at the first time and changes to the associated storage entity metadata at the second time;
   wherein receipt of the notification triggers an action related to the existing machine learning process artifact responsive to an indication of a change.

19. The computer-implemented method according to claim 18, wherein providing the notification by the query engine is responsive to a first query from a first entity to the query engine.

20. The computer-implemented method according to claim 19, wherein the first entity is a processing entity for performing one or more processes selected from a group consisting of duplicating, training, serving, deploying, producing, storing and using the existing machine learning process artifact.

21. The computer-implemented method according to claim 18, wherein providing the notification by the query engine is generated automatically by the query engine when the change occurs.

22. The computer-implemented method according to claim 8, wherein a change to the existing machine learning process artifact's associated storage entity metadata includes a change to an existing machine learning process artifact's version ID.

23. The computer-implemented method according to claim 18, wherein the existing machine learning process artifact is selected from a group consisting of data, code and model artifacts.

24. At least one non-transitory computer-readable medium storing instructions that, when executed by a computer, perform a method for injecting metadata into an existing machine learning process artifact, the method comprising:
   generating metadata related to an existing machine learning process artifact during one or more processes related to the existing machine learning process, wherein the existing machine learning process artifact is embodied in a predetermined structure and further wherein the metadata is generated at multiple distinct times;
   encoding the metadata at each distinct time in accordance with the predetermined structure; and
   embedding the metadata at each distinct time within the existing machine learning process artifact in accordance with the predetermined structure, wherein the embedded metadata at each distinct time is delineated within the predetermined structure as a separate individual record;
   storing the existing machine learning process artifact with embedded separate individual records in a storage entity after each distinct time as a distinct version.

25. The at least one non-transitory computer-readable medium of claim 24, the method further comprising wherein the processes related to the existing machine learning process artifact are selected from a group consisting of duplicating, training, serving, deploying, producing, storing and using the existing machine learning process artifact.

26. The at least one non-transitory computer-readable medium of claim 24, the method further comprising wherein the separate individual records containing the metadata are injected into the existing machine learning process artifact over time to create an audit trail.

27. The at least one non-transitory computer-readable medium of claim 26, the method further comprising wherein the separate individual records are injected sequentially to the existing machine learning process artifact over time.

28. The at least one non-transitory computer-readable medium of claim 24, the method further comprising wherein the one or more processes are performed by one or more processing entities selected from a group consisting of instrumented and un-instrumented processing entities.

29. The at least one non-transitory computer-readable medium of claim 28, the method further comprising wherein metadata generated by a process performed by an instrumented processing entity is encoded and embedded within the existing machine learning process artifact by the instrumented processing entity.

30. The at least one non-transitory computer-readable medium of claim 29, the method further comprising wherein metadata generated by a process performed by an un-instrumented processing entity is collected by a supervising entity wherein the supervising entity encodes and embeds the metadata within the existing machine learning process artifact on behalf of the un-instrumented processing entity.

31. The at least one non-transitory computer-readable medium of claim 24, the method further comprising wherein the existing machine learning process artifact is selected from a group consisting of data, code and model artifacts.

\* \* \* \* \*